United States Patent Office 3,752,785
Patented Aug. 14, 1973

3,752,785
BLEND OF SOL AND GEL CHLOROPRENE POLYMERS
John Frederick Smith, Wilmington, Del., assignor to E. I. du Pont de Nemours and Company, Wilmington, Del.
No Drawing. Continuation of application Ser. No. 864,207, Oct. 6, 1969. This application Feb. 17, 1972, Ser. No. 227,257
Int. Cl. C08f 45/34
U.S. Cl. 260—32.8 A                                6 Claims

ABSTRACT OF THE DISCLOSURE

A blend of chloroprene polymers particularly useful in sprayable solvent cements comprises by weight based on the total weight of blend, (a) about 10 to 50% of a sol chloroprene polymer which has a Mooney viscosity (ML 1+2.5 at 100° C.) of 20 to 80 and is prepared by polymerizing a chloroprene monomer in the presence of about 0.4 to 1.0 weight percent of sulfur, and (b) about 90 to 50% of a gel chloroprene polymer.

BACKGROUND OF THE INVENTION

This is a continuation of application Ser. No. 864,207, filed Oct. 6, 1969, now abandoned.

Chloroprene polymers have been widely used as the elastomeric component in solvent cements. See, for example, Report No. 55–4, "Neoprene Solvent Cements," by Louis S. Bake, published in August 1955, by E. I. du Pont de Nemours and Co. In the cement compositions described in this bulletin, the chloroprene polymer is dissolved in a solvent. For certain applications it is advantageous to apply the adhesive to the desired substrate by spraying, for example, by means of a spray gun or an aerosol bomb; however, the cements which have polymer dissolved in them exhibit the phenomenon called "cobwebbing"; that is, when the composition is sprayed, it forms tiny filaments resembling cobwebs. This cobwebbing not only wastes material but results in an extremely untidy condition of the work area.

Adhesives having good sprayability can be prepared by suspending small particles of elastomer in an organic medium in which the elastomer is not soluble. Usually the elastomer is insoluble because it is a cross-linked (gel) elastomer, although the insolubility may be also the result of using an organic medium in which the polymer is insoluble. For optimum sprayability, the polymer component should be in the form of discrete, insoluble particles of polymer having a relatively high cross-link density. References of interest in disclosing good sprayability of dispersions of elastomer particles are Canadian Pat. 586,489, and U.S. Pats. 3,179,617; 3,332,903; and 3,400,095.

However, sprayability is not the only requirement for satisfactory performance of solvent cements. The adhesive also must be capable of effecting strong bonds between substrates. While cements in which the elastomeric component is all gel give satisfactory performance in some applications, bonds of maximum strength are obtained when a portion of the elastomer is a sol-type elastomer which dissolves in the organic medium. However, in order to retain the sprayability of the adhesive, the sol elastomer in the adhesive should be of a relatively low molecular weight.

A definition of the requirements of a polymer blend for satisfactory sprayability and adequate bond strength is only the beginning of the problem from the viewpoint of making the polymer. To be economically feasible, manufacture of the desired product should be readily possible using conventional plant techniques. Chloroprene polymers are most often isolated from the latex by continuous coagulation of a polymer film in a freeze drum followed by washing and drying, as disclosed in U.S. Pat. 2,187,146. The success of this process depends on having a latex that gives a film strong enough to withstand the stresses imposed on it in the washing and drying steps. When the sol component of the blend is of the desired low molecular weight, the mixture of the sol and gel cannot be isolated in the conventional manner because they do not form films having the desired cohesive strength. While this disadvantage could be overcome by using special handling procedures, the expense of manufacture would be increased.

The compositions of the present invention can be isolated by conventional techniques and can be converted by chemical plasticization techniques to an elastomeric composition which yields adhesives which have good sprayability and which produce bonds having excellent strength.

SUMMARY

Now according to the present invention it has been found that the foregoing and related problems of the prior art can be overcome by providing novel compositions of matter which are blends of a gel and a sol chloroprene polymer, comprising, by weight based on total weight of the blend: (a) About 10 to 50 percent of a sol sulfur-modified chloroprene polymer prepared by polymerization of chloroprene in the presence of 0.4–1.0 percent of sulfur, by weight based on weight of organic monomer, which polymer has a Mooney viscosity (ML 1+2.5 at 100° C.) of about 20 to about 80, and (b) 90 to 50 percent of a gel chloroprene polymer.

DESCRIPTION OF THE PREFERRED EMBODIMENTS

The terms "sol" and "gel" used in describing chloroprene polymers which are components of the novel compositions, have the meanings well recognized in the art. "Gel" polymer does not dissolve in benzene or toluene at room temperature and "sol" polymer does dissolve in these solvents. Whether or not a solution has been effected can be determined by known techniques such as by examination under an electron microscope or by a light scattering test as described by L. H. Peebles in J. Am. Chem. Soc. vol. 80, p. 5603 (1958). Those well skilled in the art usually know by the methods used in polymerization whether sol or gel polymer will be produced.

(a) Preparation of sulfur-modified sol chloroprene polymer

The sulfur-modified sol chloroprene polymers are prepared by the well-known methods in chloroprene polymerization. Polymerization is carried out in aqueous emulsion using any of the conventional emulsifying agents. These include the water-soluble salts, particularly the sodium, potassium, or ammonium salts, of compounds of the following types; long-chain fatty acids; rosins or rosin derivatives, such as wood rosin, tall oil rosin, disproportionated rosin, or partially polymerized rosin; higher alcohol sulfates; and arylsulfonic acids such as alkylbenzenesulfonic acids or condensation products of formaldehyde with naphthalenesulfonic acids.

The concentration of organic monomer present in the starting emulsion is not critical. In general, 30 to 60 percent by weight, based on the total weight of the emulsion, is the range used in the preparation of the polymer.

It is preferred to use a pH in the alkaline range.

The polymerization can be carried out between 0° C. and 80° C., preferably between 30° C. and 50° C.

Polymerization is initiated and maintained by the addition of a free-radical polymerization catalyst such as an organic or inorganic peroxide or hydroperoxide.

Mooney viscosity of the polymer is controlled by having present in the polymerization system a conventional chain-transfer agent such as an alkyl mercaptan or a dialkyl xanthogen disulfide, the viscosity varying inversely with the amount of transfer agent.

The conversion of monomer to polymer in the polymerization process depends somewhat on the type and amount of chain-transfer agent used, but in general ranges between 60 and 90 percent. Polymerization is stopped when desired by adding a conventional "short-stopping" agent such as disclosed in U.S. Pat. 2,576,009. Any unreacted monomer is removed by known methods, such as by steam stripping as disclosed in U.S. Pat. 2,467,769.

Up to 50 percent of the chloroprene can be replaced by another copolymerizable monomer. However, if the cements are to be sprayable without cobwebbing the monomer should be free of acidic groups such as the carboxy group. Examples of suitable comonomers that can be used are those disclosed in U.S. 3,147,318, to Jungk (col. 2, lines 5–14) or 3,308,087, to Garrett (col. 22, lines 41–46).

The chloroprene should be polymerized in the presence of at least 0.4 part of sulfur per 100 parts of organic monomer in order that the polymer will be capable of being peptized to the desired degree. High-molecular-weight sol polymer forms solutions of relatively high viscosity and it is this dissolved high-molecular-weight polymer that produces the undesirable cobwebbing. The intralinear sulfide linkages introduced into the polymer by at least 0.4 part of sulfur in the polymerization recipe enables the polymer to be reduced in molecular weight to a satisfactory degree. More than about 1.0 part of sulfur per 100 parts of monomer is not required to obtain the desired degree of peptizability and it is difficult to incorporate more than this amount into the polymerization system because of the limited solubility of sulfur in the chloroprene. Special solubilizing agents are required if more than about 1 part is to be used. The preferred amount of sulfur is about 0.6 to about 0.8 part.

The Mooney viscosity of the sol component must be at least 20 to give a polymer blend which will form sufficiently strong films to be handleable during the isolation and drying steps. Mooney viscosity is determined by isolating, washing, and drying a sample of the polymer and determining the viscosity by ASTM Method D 1646–63 at 100° C. using the large rotor after preheating following 2.5 minutes of shearing at 100° C. (ML 1+2.5). If the Mooney viscosity of the sol component exceeds about 80, it cannot be reduced sufficiently to obtain sprayable cements from the polymer.

The lower range of sulfur, i.e. .4 to .6 part per 100 parts of monomer, will preferably be used when preparing polymer in the lower ranges of Mooney viscosity.

(b) Preparation of gel chloroprene polymer

The "gel" chloroprene polymer can be prepared by any method which will yield a cross-linked polymer in latex form. For example, the chloroprene can be polymerized to a high conversion in the absence of or with relatively small amounts of chain-transfer agents such as the alkyl mercaptans or the dialkyl xanthogen disulfides. A suitable method of carrying out such a high-conversion process is disclosed, for example, in U.S. Pat. 3,147,317. Another method of inducing formation of a cross-linked chloroprene polymer is to have present in the polymerization system a monomer which will copolymerize with the chloroprene and which contains two or more polymerizable double bonds. Examples of such suitable monomers include divinylbenzene and esters of methacrylic acid with polyhydroxy compounds such as the alkylene glycols, dihydroxybenzene, or trimethylolpropane.

These polymerizations are, in general, carried out using the same general techniques as are used in polymerizing the sol chloroprene polymer except that the monomer conversion may be allowed to proceed to a greater extent, such as 90–100%.

Another method of preparing cross-linked gel chloroprene polymers suitable for use in practicing this invention is by after-treatment of the latex in such a way as to cross-link the polymer contained therein. Examples of suitable methods are by radiation treatment as disclosed in U.S. Pat. 3,042,652 and treatment with an organic peroxy compound as disclosed in U.S. Pat. 3,147,318. Other methods will be within the scope of those skilled in the art.

In the preparation of the gel component, part of the chloroprene, up to about 20%, may be replaced with another monomer of the same type listed above in describing the preparation of the sol polymer component.

(c) Preparation of the blend of sol and gel copolymer

The blending of the components of the elastomeric composition is conveniently carried out by thoroughly mixing the latices and then isolating the polymer mixture by conventional methods such as by coagulation by freezing (as described in U.S. Pat. 2,187,146) or by drum drying (as described in U.S. Pat. 2,914,497).

The proportion of sol to gel copolymer may range from 1:9 to 1:1, by weight. At least 10 percent of the mixture must be sol polymer in order that the adhesive will form bonds of adequate strength. On the other hand, at least 50 percent of the mixture should be gel polymer in order that the cements will have adequate sprayability.

Determination of sprayability is described in the examples.

(d) Preparation of adhesives

The preparation of adhesive compositions from the sol-gel blends of this invention in general follows known techniques used in preparation of solvent cements in which the elastomer dissolves in the solvent. It is usually desired that the solids content of these adhesive compositions should range from about 10 to about 35 percent. Less than about 10 percent is uneconomical because of the excessive amount of solvent required. In general, adhesives containing more than about 35 percent are too viscous to be practical. The preferred solids content is 22–25 percent.

Chloroprene polymer adhesives normally contain one or more alkaline stabilizing ingredients. These ingredients are required to ensure good aging of the chloroprene polymers. In addition, they slowly vulcanize deposited films at ambient temperatures. The alkaline stabilizing ingredients include divalent metal oxides such as magnesium oxide, calcium oxide, cadmium oxide, and lead oxide. Magnesium oxide is the preferred alkaline agent since it gives the best results. The quantity of these oxides should be chemically equivalent to at least 2 parts of magnesium oxide per hundred parts of polymer. While the upper limit is not particularly critical, the amount of alkaline ingredient should preferably not exceed an amount equivalent to about 30 parts of magnesium oxide per 100 parts of polymer. This amount of alkaline agent present includes the amount which will react with any magnesia-reactive resins present in the adhesive composition.

Zinc oxide, which is usually included in chloroprene polymer formulations, may also be present in the adhesives based on compositions of this invention. Suitable amounts range from about 2 to about 10 parts by weight per 100 parts of polymer.

Oil-soluble resins are often included in chloroprene polymer adhesives to improve tack retention, reduce viscosity, increase adhesion or cohesion, or for other purposes depending on the use to be made of the adhesive. See, for example, the discussion of resins in U.S. Pat. 3,332,903, column 2, beginning at line 51. In adhesives prepared from chloroprene polymers the resins most often used are the heat-reactive phenol-formaldehyde resins prepared by reacting 1 mole of a para-substituted phenol with 1–2 moles of formaldehyde in the presence of an alkaline condensation catalyst. Phenols substituted in the para position with alkyl groups having 3 to 8 carbon atoms are useful for preparing these resins. Examples of suitable alkyl groups are propyl, isopropyl, tert-butyl, cyclohexyl, tert-amyl, and octyl. Aryl-substituted phenols, such as p-phenylphenol and p-tolylphenol, can also be used. The resin reacts with the alkaline stabilizing ingredient to form a modified resin which no longer melts on heating, as does the resin in its unreacted state, but instead decomposes at high temperatures of the order of 250° C. These resins may be reacted with the alkaline metal oxide before addition to the adhesive composition as described in U.S. Pat. 3,044,976, or the resin and metal oxide may be allowed to interact in the adhesive composition. A small amount of water has been found to accelerate the reaction. The amount of resin most often used is 10 to 100 parts per 100 parts of polychloroprene.

The solvents that can be used in preparation of the cement compositions should dissolve the resin and the sol chloroprene polymer. They should provide a dispersing medium for the gel component of the polychloroprene mixture. In general, the same solvents can be used as are used in the preparation of adhesives in which the polymer is soluble. See, for example, the discussion in U.S. Pat. 3,308,087, column 6. A mixture of solvents very often used is a mixture of toluene, hexane, and methyl ethyl ketone in a volume ratio of 1:4:4, and this is the solvent composition which has been used in the examples hereinbelow in testing for sprayability.

During the preparation of the adhesives it is essential that an agent be added that will reduce the molecular weight of the polymer by cleaving it at the sulfide linkages incorporated in the polymer during the polymerization. In the neoprene field, these agents are usually called "peptizing agents," and the process of reduction of molecular weight by cleaving the sulfide linkages is called "peptization." Suitable peptizing agents include aromatic and aliphatic mercaptans and salts thereof, aliphatic and aromatic disulfides, and tetraalkylthiuram disulfides. Examples include benzenethiol, xylenethiol, phenyl disulfide, xylyl disulfides, tetramethylthiuram disulfide, tetraethylthiuram disulfide, 2,2′-dibenzamidodiphenyl disulfide, and zinc 2-benzamidothiophenate. The exact amount to be used will vary with the amount of sulfur which has been incorporated into the polymer and the molecular weight of the peptizing agent. In general, 0.5 to 2 parts by weight of peptizing agent per 100 parts of chloroprene polymer will suffice. The peptizing agent can be added to the polymer on the mill along with other processing ingredients or it can be added to the adhesive composition after the polymer has been incorporated in the solvent component.

The cement compositions may further include other compounding ingredients such as antioxidants, pigments, dyes, and fillers.

Preparation of the adhesive compositions can be accomplished by the procedures employed for the manufacture of conventional chloroprene polymer cements. The most common procedure is to mill-mix the chloroprene polymer with compounding ingredients, not including the resin, and to add the resulting mixture to a solution of resin in the solvent in a cement churn or other suitable mixer. Because of the gel component in the polymer blend of this invention, it is more difficult to form a smooth homogeneous-appearing cement than when the polymer is all of the sol type. It is, therefore, often necessary to apply more energy in the mixing step.

The adhesive compositions above-described are excellent for use in any application where it is desired to spray the adhesive on a substrate. Conventional spray equipment, such as spray guns and aerosol bombs, is used. While the adhesive bonds obtained from the mixture are sometimes not as strong as can be obtained using the conventional adhesives in which all sol polymer is used, they are adquate for many uses in which the convenience of application is the controlling factor. Examples of such uses include adhering interior molding for automobiles, adhering rubber to metal containers, tubing, lines, etc., as a protection against acid and other chemicals, and in laminations in general where smooth, even coatings are desired and where bond strength need not be maximum.

The invention will be better understood by reference to the following illustrative examples. Parts are by weight unless otherwise specified.

EXAMPLE 1

(A) Preparation sol chloroprene polymer

Three sol sulfur-containing chloroprene polymers having three different Mooney viscosities are prepared using the following recipes:

|  | Parts by weight | | |
|---|---|---|---|
|  | I | II | III |
| Chloroprene | 100 | 100 | 100 |
| Sulfur | 0.8 | 0.8 | 0.8 |
| Disproportionated rosin (Acid No. 140) [a] | 4 | 4 | 4 |
| Diisopropyl xanthogen disulfide | 0.84 | 0.78 | 0.72 |
| Water | 115 | 115 | 115 |
| Sodium hydroxide | 0.48 | 0.48 | 0.48 |
| Sodium salt of condensate of formaldehyde and naphthalenesulfonic acid [b] | 0.32 | 0.32 | 0.32 |
| Mooney viscosity of isolated sample of polymer (ML 1+2.5 at 100° C.) | 22 | 26 | 33 |

[a] Resin 731–SA, Hercules, Inc.
[b] "Lomar" PW, Nopco Chemical Co.

Polymerization is carried out at 40° C. using as catalyst an aqueous solution containing 5% potassium persulfate. The monomer conversion is about 86–90%. Polymerization is stopped by adding an emulsion containing 1% phenothiazine and 1% 4-tert-butylpyrocatechol (about 1.4 parts are added).

In the case of I, polymerization is completed to the desired degree by the addition of 2 parts of 5% solution of sodium hydrosulfite dihydrate. Unreacted monomer is removed by turbannular steam stripping.

(B) Preparation of gel chloroprene polymer

A gel chloroprene polymer is prepared in an aqueous emulsion using the following polymerization recipe:

| | Parts by weight |
|---|---|
| Chloroprene | 96 |
| Ethylene dimethacrylate | 4 |
| Dodecyl mercaptan | 0.23 |
| Disproportionated rosin (acid No. 140) | 3 |
| Water | 108 |
| Sodium hydroxide | 0.59 |
| Sodium salt of condensate of formaldehyde and naphthalenesulfonic acid | 0.46 |
| Sodium sulfite | 0.3 |

Polymerization is carried out at 40° C. using a 5% aqueous solution of potassium persulfate as catalyst. Conversion is taken to about 93%. Polymerization is stopped by adding an emulsion containing 1% phenothiazine and 1% 4-tert-butylpyrocatechol (about 1.4 ml. are added).

(C) Preparation of sol-gel blends

Six different mixtures are prepared using the three different sol components described hereinabove under heading (A) and the gel component described under heading (B). Three of the mixtures contain 40% and three contain 30% of the sol component. The mixtures are prepared by mixing the two latexes in the desired proportions, acidifying to pH 6 with 10% acetic acid, isolating the polymer mixture on a freeze roll, washing and drying at 100° C. No difficulty is experienced in handling the polymer films.

(D) Preparation of adhesives

Adhesive compositions are prepared using the following recipe:

| | Parts by weight |
|---|---|
| Polymer mixture | 100 |
| Magnesia | 4 |
| Zinc oxide | 5 |
| 2,2'-methylenebis(6-tert-butyl-p-cresol) | 2 |
| Phenol-formaldehyde resin [a] | 40 |
| Mixed xylenethiols (71% solution in petroleum oil [b]) | 1 |
| 1,4-diazabicyclo[2.2.2]octane [c] | 0.25 |
| Water [d] | 2 |
| Solvent [e] | 478 |

[a] An oil-soluble, heat-reactive resin prepared by mixing 1 mole of p-tert-butylphenol with 1 to 2 moles of formaldehyde under alkaline conditions ("Bakelite" Resin CKM-1634, Union Carbide Corp.).
[b] A peptizing agent for the sulfur-containing chloroprene polymer. The mercaptans react to cleave the sulfide linkages in the polymer and thus reduce the molecular weight of the polymer.
[c] A promoter for the peptization reaction.
[d] Water promotes the reaction of magnesia with the phenolic resin.
[e] The solvent used is a mixture of toluene, hexane, and methyl ethyl ketone in a proportion by volume of 1 : 4 : 4, respectively.

The adhesive composition is prepared by mixing the polymer and metal oxides on a rubber compounding mill, cutting the "mill mix" into pea-size pieces, adding these to the rest of the ingredients and rolling on a roller mill overnight. The resulting composition is homogenized in an Eppenbach "Homo-Mixer" Type CS. The resulting cement contains about 24 to 25% solids.

(E) Testing

Sprayability is judged on an estimated scale of 1 (for the best) to 10 (for the worst). The adhesive is sprayed onto a cardboard by means of a Binks spray gun No. 18 (Binks Manufacturing Co.) using fluid nozzle 63C and air nozzle 63PB. A typical line pressure is 40 p.s.i. and a typical pot pressure is 15 p.s.i. (A dye is included to facilitate evaluation.) The sprayability is evaluated partly on the pattern that the spray makes on the cardboard and partly on the degree of cobwebbing of the effluent from the spray gun.

To show the strength of the adhesive bonds, test specimens are prepared by applying three or four coats of adhesive to each of two 1-inch-wide strips of unsized No. 10 canvas duck, allowing about 30 minutes between coats and using sufficient coats to cover the weave of the cotton duck. Before the last coat is dry, the two pieces are rolled together firmly with a hand roller. The bonds are aged 7 days at room temperature and then pulled apart at room temperature using an "Instron" tensile tester at a head speed of 2 inches per minute. (One end of the test sample is left uncoated so that the test assembly may be fastened in the jaws of the tensile testing machine.) The force required to separate the test pieces is measured. This is reported as pounds per linear inch (p.l.i.).

Table I shows the sprayability and bond strength obtained from each of the adhesives.

TABLE I

| | 1 | 2 | 3 | 4 | 5 | 6 |
|---|---|---|---|---|---|---|
| Percent sol | 40 | 40 | 40 | 30 | 30 | 30 |
| Sol component | AI | AII | AIII | AI | AII | AIII |
| Mooney viscosity of sol polymer | 22 | 26 | 33 | 22 | 26 | 33 |
| Cement properties: | | | | | | |
| Sprayability | 3 | 2 | 3 | 1 | 1 | 1 |
| Canvas to canvas adhesion, p.l.i. | 21 | 22 | 22 | 19 | 23 | 21 |

EXAMPLE 2

(A) Preparation of sol polymer

In this example a sulfur-containing sol chloroprene polymer is prepared using the same polymerization recipe as in Section A of Example 1 except that 0.56 part of diisopropyl xanthogen disulfide and 0.66 part of sodium hydroxide are used. About 2 parts of the short-stopping emulsion are added. A sample of the final polymer has a Mooney viscosity of 65.

(B) Preparation of gel polymer

A gel polymer is prepared using the following recipe:

| | Parts by weight |
|---|---|
| Chloroprene | 96 |
| Ethylene dimethacrylate | 4 |
| Disproportionated rosin (acid No. 140) | 3 |
| Technical dodecyl mercaptan | 0.23 |
| Water | 108 |
| Sodium hydroxide | 0.94 |
| Sodium salt of condensate of formaldehyde and naphthalenesulfonoic acid | 0.70 |
| Sodium sulfite | 0.3 |

Polymerization is carried out at 40–45° C. using a 0.15% aqueous solution of potassium persulfate as catalyst. At a specific gravity of 1.069, addition of 5% aqueous potassium persulfate is begun. To complete polymerization to the desired degree, cumene hydroperoxide (0.11 part) is added followed by gradual addition of a 5% aqueous solution of sodium hydrosulfite dihydrate (0.51 part). Conversion is 90–95%. Polymerization is stopped as in Example 1.

(C) Preparation of sol-gel blends

The gel and sol components prepared above are mixed in latex form and isolated as described in Example 1, Section (C), to give a mixture containing 70% of the gel and 30% of the sol.

(D) Preparation of adhesives

Adhesives are prepared by milling the polymer mixture with compounding ingredients using the following recipe:

| | Parts by weight |
|---|---|
| Polymer mixture | 100 |
| Zinc oxide | 5 |
| Magnesia | 4 |
| 2,2'-methylenebis(6-tert-butyl-p-cresol) | 2 |

Portions of the milled mixture each weighing 83.25 parts (to give 75 parts of polymer) are homogenized in 359 parts of the same solvent mixture used in Example 1 containing dissolved therein 30 parts of the same phenol-formaldehyde resin and 2 parts of water. To show the importance to sprayability of having a low-molecular-weight sol component, 1 part of mixed xylenethiols is added to one sample of the cement and the peptizing agent is omitted from a second sample.

TABLE II

| Sol polymer component: | Sprayability |
|---|---|
| (1) S-containing polymer, peptizer added | 1 |
| (2) S-containing polymer, no peptizer added | 10 |

From the Table II it can be seen that when a sol polychloroprene is used in which the sol component has a relatively high molecular weight, the resulting adhesive has poor sprayability. On the other hand, when the sol component contains sulfide linkages which are broken down by chemical means to yield a polymer having a lower molecular weight, the resulting adhesive has excellent sprayability.

I claim:
1. A sol-gel chloroprene polymer blend composition comprising, by weight based on the total weight of the polymer blend:
   (a) About 10 to 50 percent of a sulfur-modified sol chloroprene polymer prepared by polymerizing a chloroprene monomer in the presence of a chain-transfer agent and about 0.4 to 1.0 weight percent of sulfur, and having a Mooney viscosity (ML 1+2.5 at 100° C.) of about 20 to about 80, and

(b) About 90 to 50 percent of discrete, benzene- and toluene-insoluble particles of a gel chloroprene polymer obtained from a latex thereof in which the polymer is present in cross-linked form, said blend being prepared by thoroughly mixing latexes of components (a) and (b) and isolating the polymer mixture, and (c) About 0.5 to 2 parts by weight, per 100 parts of said chloroprene polymers, of a peptizing agent selected from the group consisting of aromatic and aliphatic mercaptans and salts thereof, aliphatic and aromatic disulfides, and tetraalkylthiuram disulfides; said composition being adapted to be peptized in an organic solvent for the sol polymer component to give an adhesive composition which is sprayable without substantial cobwebbing.

2. A composition of claim 1 wherein up to about 50 percent by weight of the sol polymer is copolymerized monomer other than chloroprene, said other monomer being substantially free of acidic groups.

3. A chloroprene polymer adhesive composition, sprayable without substantial cobwebbing, comprising about 10 to 35 percent by weight of a polymer blend, (a) plus (b), of claim 1, peptized in an organic solvent for the sol polymer component, (a), with about 0.5 to 2 parts by weight, per 100 parts of said chloroprene polymers, of a peptizing agent selected from the group consisting of aromatic and aliphatic mercaptans and salts thereof, aliphatic and aromatic disulfides, and tetraalkylthiuram disufides.

4. An adhesive composition of claim 3 wherein the solvent is a mixture of toluene, hexane and methyl ethyl ketone in a volume ratio of 1:4:4.

5. An adhesive composition of claim 3 which contains an alkaline stabilizing ingredient selected from the group consisting of magnesium oxide, calcium oxide, cadmium oxide and lead oxide.

6. An adhesive composition of claim 5 which contains a reaction product of a heat-reactive phenol-formaldehyde resin with the alkaline stabilizing ingredient.

References Cited

UNITED STATES PATENTS

| | | | |
|---|---|---|---|
| 3,400,095 | 9/1968 | Kremer et al. | 260—32.8 R |
| 3,147,318 | 9/1964 | Jungk | 260—890 |
| 3,378,538 | 4/1968 | Sparks | 260—92.3 |
| 3,308,087 | 3/1967 | Garrett | 260—92.3 |

MORRIS LIEBMAN, Primary Examiner

J. H. DERRINGTON, Assistant Examiner

U.S. Cl. X.R.

260—32.8 A, 79.1, 92.3, 890